Figure 1:
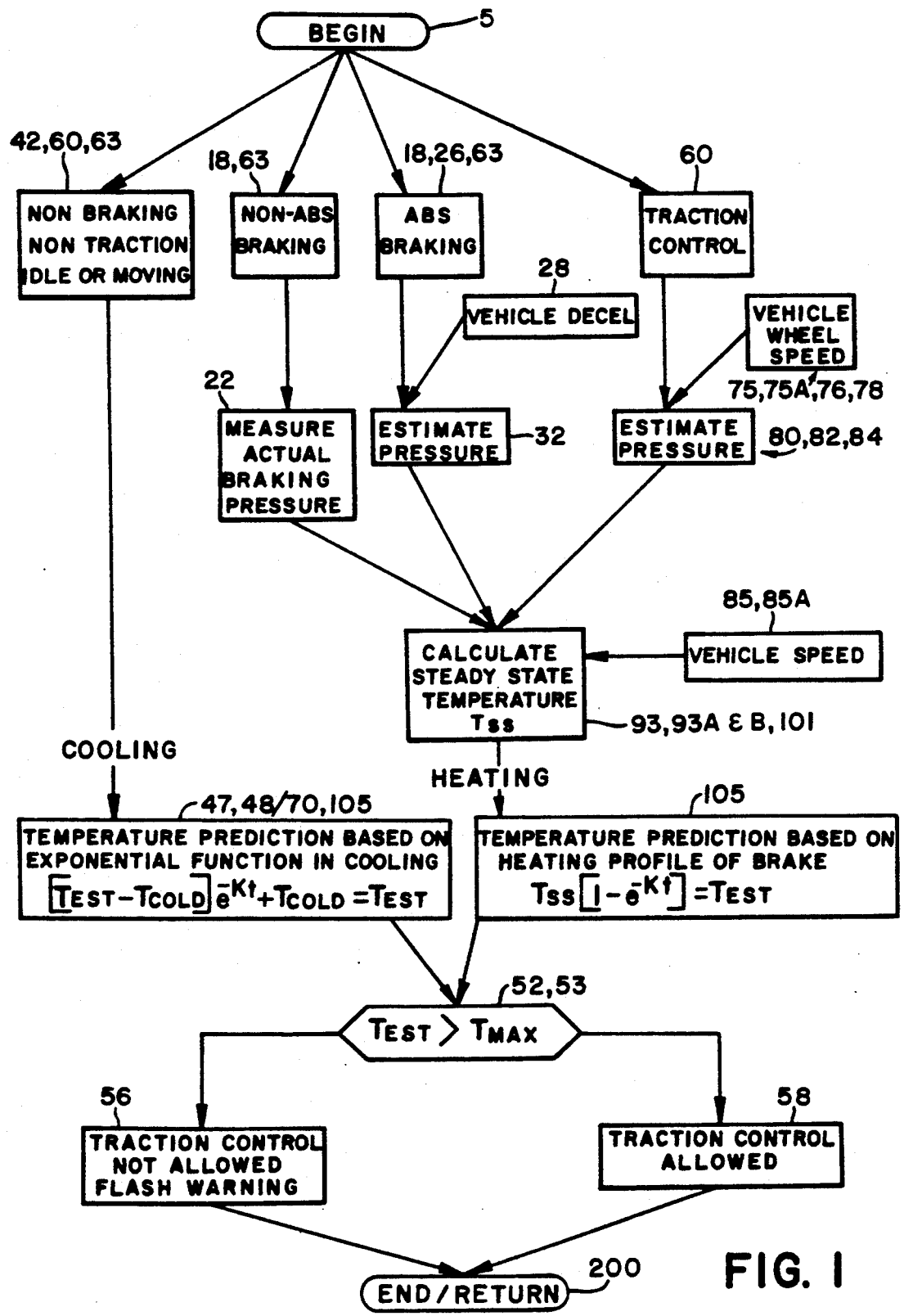

United States Patent [19]
Bannon et al.

[11] Patent Number: 5,136,508
[45] Date of Patent: Aug. 4, 1992

[54] BRAKE LINING TEMPERATURE PREDICTION FOR A TRACTION CONTROL SYSTEM

[75] Inventors: Charles J. Bannon, Garden City, Mich.; Michael E. Gatt, Osceola, Ind.

[73] Assignee: Allied-Signal Inc., Morristown, N.J.

[21] Appl. No.: 540,679

[22] Filed: Jun. 19, 1990

[51] Int. Cl.⁵ .............................................. B60T 8/00
[52] U.S. Cl. .................. 364/426.01; 364/557; 188/106 P
[58] Field of Search ............. 364/557, 426.01, 424.05, 364/426.03; 374/101, 143, 46; 188/1.11, 106 P

[56] References Cited

U.S. PATENT DOCUMENTS

| | | | |
|---|---|---|---|
| 4,241,603 | 12/1980 | Han et al. | 73/129 |
| 4,484,280 | 11/1984 | Brugger et al. | 364/426.03 |
| 4,591,213 | 5/1986 | Rapoport | 303/93 |
| 4,758,969 | 7/1988 | Andréet al. | 364/557 |
| 4,964,679 | 10/1990 | Rath | 303/100 |

FOREIGN PATENT DOCUMENTS 8702948 5/1987 Fed. Rep. of Germany .
2509242 1/1983 France .

Primary Examiner—Thomas G. Black
Attorney, Agent, or Firm—Larry J. Palguta; Ken C. Decker

[57] ABSTRACT

A brake control system which provides both adaptive braking operation and traction control operation includes a brake lining temperature prediction mechanism which enables the control system either to permit traction control operation or to disable traction control operation so that the brake linings will not be worn out prematurely by traction control operation when the linings are above a temperature threshold.

32 Claims, 6 Drawing Sheets

BRAKE LINING TEMPERATURE PREDICTION FOR A TRACTION CONTROL SYSTEM

With the proliferation of adaptive braking systems comes the opportunity to provide traction control systems as an additional system. Traction control is essentially the reverse of adaptive braking. In adaptive braking, brake pressure transmitted to the wheel brakes is sequentially released and reapplied in order to ensure that the wheels never become locked up and cause skidding of the vehicle. In traction control, the object is to keep the wheels from spinning relative to the road surface. This is accomplished by systematically applying and releasing braking pressure so that the wheels are always at approximately the maximum rotational speed of engagement with the road surface whereby the wheels maintain traction and do not begin to slip relative to the road surface. Thus, adaptive braking may be stated simply as releasing and modifying brake pressure so that the wheels do not stop spinning and lose traction relative to the road surface, while in traction control the brake pressure is applied and released so that the wheels do not spin excessively and lose traction relative to the road surface.

One of the major concerns for traction control is the occurrence of reduced brake lining life as a result of excessive use of traction control. Specifically, if a driver has overheated the vehicle brakes, it is not desirable to utilize a prolonged traction control application. The undesirability of this results from the brake lining wear versus temperature characteristics of the brake linings. As the brake lining material becomes hotter, its wear rate, based on a fixed number of stops and pressures, increases linearly until some temperature range is reached. Beyond this temperature range, the wear rate tends to increase rapidly in an exponential manner. Through the introduction of traction control, a function has been added to the brake system which is not a mandatory safety item. As a result, it is prudent that, in order to preserve brake lining life, any nonsafety related function of the brake system be disabled when the brake lining is at an extreme temperature condition and consequently in a high lining wear situation. This condition is more likely to occur if the traction control system is simply operated by pulsing brake pressure and is not interacting with or controlling engine torque output. The objective of the present invention is to implement a lining wear protection mechanism and method into traction control software, in order to temporarily disable traction control whenever the predicted lining temperature is too hot. When this condition of disabled traction control occurs, the vehicle operator may be advised by either visual and/or audible signals. The method of predicting temperature is a calculation based on the heat transfer characteristics of a particular brake. The calculation utilizes a combination of theoretical and experimental relations. The particular algorithm utilized within the method shares several of the variables utilized by adaptive braking software and thus does not require any additional hardware inputs into the electronic control unit. The temperature prediction algorithm utilized in the method keeps a real time estimate of brake lining temperature. This estimate is based upon the gross amount of energy a brake can dissipate relative to the calculated value of energy being absorbed by the brake lining.

The present invention provides a solution to the above problems by providing in a wheeled vehicle having means for supplying pressurized brake fluid to actuate the associated wheel brakes of the vehicle, a brake control system for providing both adaptive braking operation and traction control operation of at least one selected wheel brake of the vehicle, said control system calculating a brake lining temperature prediction and including:
  a. means for determining the mode of the selected wheel brake as being one of:
    1. non-braking and non-traction control,
    2. braking during non-adaptive braking operation,
    3. braking during adaptive braking operation, and
    4. traction control operation,
  b. means for calculating a temperature prediction based on cooling of the selected wheel brake, when mode a.1. occurs,
  c. means for measuring actual braking pressure and calculating a steady state temperature which is utilized to calculate a temperature prediction based on a heating profile of the brake, when mode a.2. occurs,
  d. means utilizing estimated braking pressure and vehicle deceleration for calculating a steady state temperature and calculating a temperature prediction based on the heating profile of the brake, when mode a.3. occurs,
  e. means utilizing estimated braking pressure and vehicle wheel speed for calculating a steady state temperature and calculating a temperature prediction based on the heating Profile of the brake, when mode a.4. occurs, and
  f. means for comparing the temperature prediction with a temperature limit in order to determine one of permitting and not permitting traction control operation by the control system.

Figure 2A:
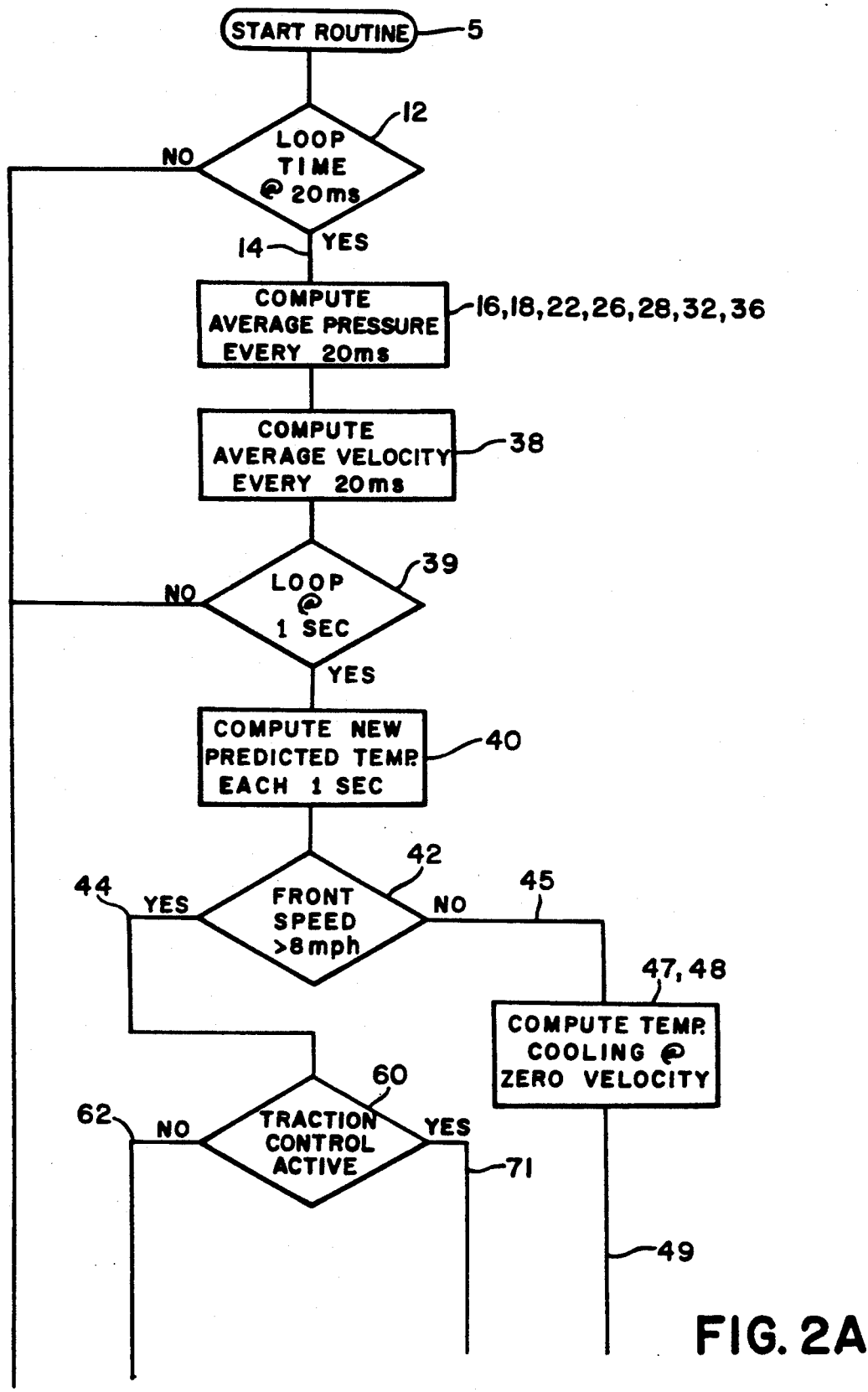
Figure 2B:
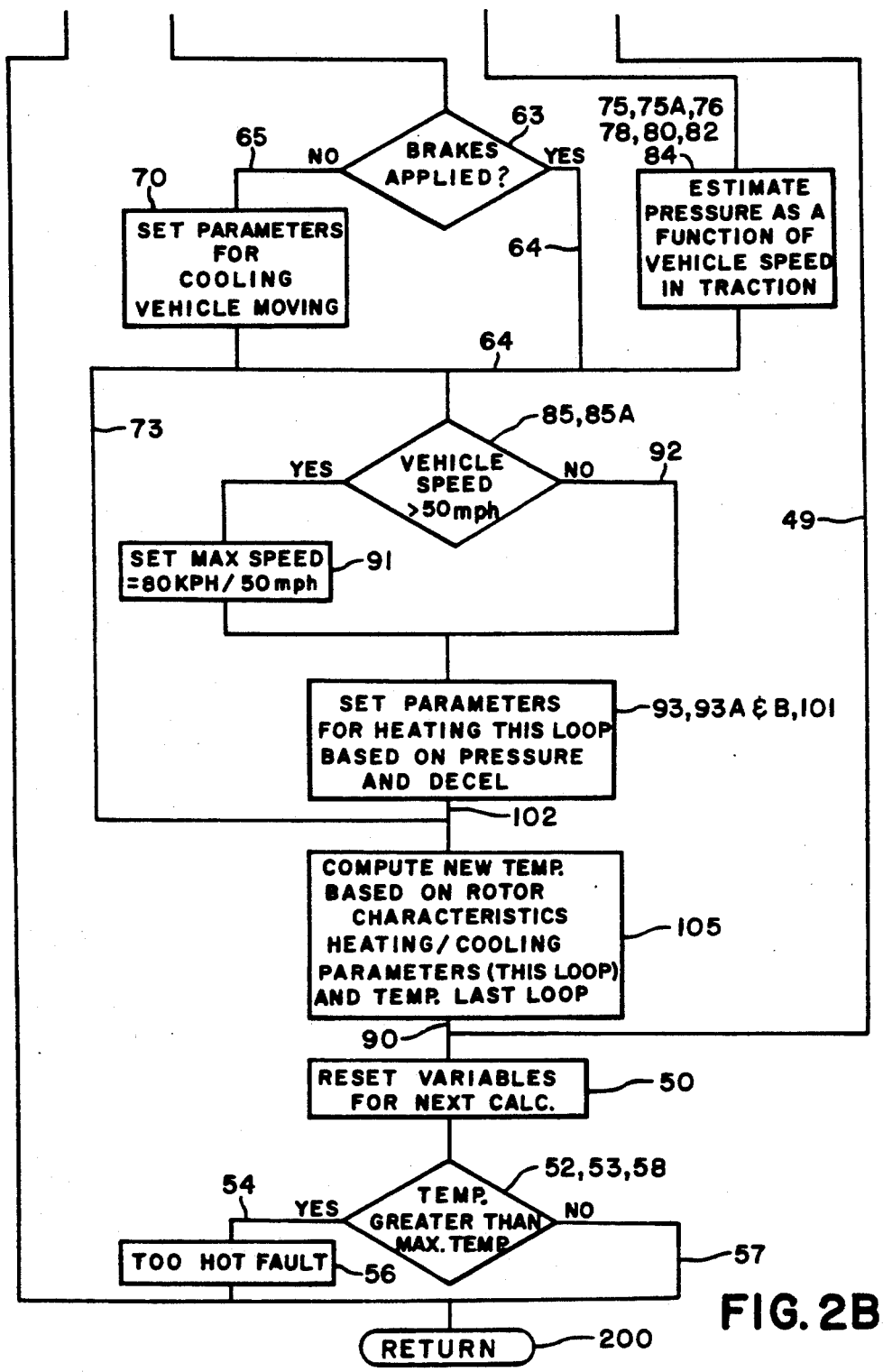

The invention is described in detail below with reference to the drawings which illustrate an embodiment in which:

FIG. 1 is a simplified flow chart of the software program contained in the invention, FIGS. 2A and 2B are a more detailed flow chart of the flow chart illustrated in FIG. 1, and FIGS. 3A–3C comprise a more detailed flow chart and Practical embodiment of the flow chart illustrated in FIGS. 2A and 2B.

The method of brake lining temperature prediction utilizes an evaluation of the vehicle brakes in four different modes of operation. The four modes of brake operation are as listed below:

| MODE | TEMPERATURE STATE |
| --- | --- |
| 1. NON-BRAKING, NON-TRACTION CONTROL, IDLE OR MOVING, | COOLING |
| 2. NORMAL BRAKING | HEATING |
| 3. ADAPTIVE BRAKING | HEATING |
| 4. TRACTION CONTROL | HEATING |

Referring to FIG. 1, there is illustrated a simplified flow chart which illustrates the manner in which the brake lining temperature prediction of a brake control system is developed in order to enable or disable the traction control system portion of the control system. The vehicle's electronic control unit contains a software program beginning at BLOCK 5 and then which proceeds to determine the mode of operation of the vehicle brakes. The blocks of the software diagram contain numbers which correspond generally with the numbers utilized in the more detailed software flow diagram of FIGS. 2A and 2B and the detailed software flow diagram of FIGS. 3A-3C. Because the flow chart of FIG. 1 is simplified, groups of BLOCK numbers apply to one or more BLOCKS and the same number may refer to more than one BLOCK. The same applies for FIGS. 2A and 2B relative to FIGS. 3A-3C. The software program determines whether the mode of operation for the brakes comprises a non-braking, non-traction control mode, idle or moving; a nonadaptive braking system braking application; an adaptive braking system braking application; or the utilization of the brakes during traction control. If the vehicle and brakes are below or above an idle speed, the brakes not being utilized, and the traction control system not operating as indicated in BLOCK 42, 60, 63, then the program proceeds to the cooling routine of BLOCK 47, 48/70, 105 wherein the program determines a temperature prediction based on the normal exponential function utilized in cooling. The determination of the estimated temperature prediction ($T_{est}$) then is utilized at BLOCK 52, 53 to compare $T_{est}$ with a preset maximum temperature ($T_{max}$). If the estimated temperature prediction is less than the preset maximum temperature, then via BLOCK 58 the operation of the traction control system is permitted and the program proceeds to the end-/return BLOCK 200.

Should it be determined that the vehicle brakes are in the mode of operation occurring during nonadaptive braking system braking (normal braking) as shown at BLOCK 18, 63 then the program evaluates the actual braking pressure utilized at the brakes (BLOCK 22) and proceeds to calculate the steady state temperature $T_{ss}$) at BLOCK 93, 93A and B, 101. The steady state temperature calculation includes an input of the vehicle speed from BLOCK 85 and 85A. Once the steady state temperature ($T_{ss}$) is determined, the program utilizes that to provide an estimated temperature prediction based on the heating profile of the brake at BLOCK 105. The estimated temperature prediction or $T_{est}$ calculated at BLOCK 105 is then utilized at BLOCK 52, 53 to determine if the estimated temperature prediction is greater or less than the preset maximum temperature ($T_{max}$). If the estimated temperature prediction should exceed the preset maximum temperature, then via BLOCK 56 the traction control system is disabled and a warning light energized. The program then proceeds to the end-/return BLOCK 200. If the estimated temperature prediction is less than the preset maximum temperature, the program proceeds to BLOCKS 58 and 200 as above.

Referring to BLOCK 18, 26, 63 of the flow diagram of FIG. 1, should the brakes be in a mode of operation during adaptive braking system braking, the estimated brake pressure is utilized via BLOCK 32 along with an input of vehicle deceleration from BLOCK 28 to provide an input to BLOCK 93, 93A and B, 101 in order to calculate the steady state temperature. From this point, the program proceeds as described above.

Should the brakes be in a mode of operation during traction control as indicated at BLOCK 60, then inputs of vehicle speed (via wheel speed) and estimated pressure via BLOCKS 75, 75A, 76, 78, 80, 82 and 84 are utilized as inputs to BLOCK 93, 93A and B, 101 to calculate the steady state temperature ($T_{ss}$). The program then proceeds as described above in order to determine the estimated temperature prediction and compare it with the preset maximum temperature in order to determine whether or not the vehicle traction control system should continue to operate or be disabled.

FIGS. 2A and 2B illustrate in more detail a software flow diagram which implements the method or process illustrated in FIG. 1. The software program begins at BLOCK 5 and proceeds to BLOCK 12 where the loop time is set at 20 millisecond increments. The program proceeds via LINE 14 to BLOCK 16, 18, 22, 26, 28, 32, 36 where the program computes the average brake pressure every twenty milliseconds. This calculation is based on the state or mode of operation of the brakes. It may utilize transducer braking pressure if there is occurring non-ABS braking, or it may utilize calculated braking pressure if an adaptive braking system operation is occurring and the vehicle is decelerating. From BLOCK 16, 18, 22, 26, 28, 32, 36 the program proceeds to BLOCK 38 to compute the average velocity of a front wheel of the vehicle every 20 milliseconds. At BLOCK 39 the time is incremented for each 20 millisecond period so that at a total count of 50 (1 second) the program will proceed to the temperature prediction calculation. At one second, the program proceeds to BLOCK 40 in order to compute the new predicted temperature each second. From BLOCK 40 the program considers at BLOCK 42 a front wheel speed. If the front wheel speed is greater than 13 kilometers per hour/8 miles per hour (the vehicle moving), the program proceeds via LINE 44 to BLOCK 60. If the front wheel speed is less than or equal to 13 kilometers per hour/8 miles per hour (the vehicle and brakes at idle), the program proceeds via LINE 45 to BLOCK 47, 48. At BLOCK 47, 48, the program computes the estimated temperature prediction of the brake in a cooling mode at 0 velocity. Because of the 0 velocity, no convective cooling factor is utilized. The calculation is based on pressure, speed, and rotor characteristics. Having calculated the estimated temperature prediction at BLOCK 47, 48, the program proceeds via LINE 49 to BLOCK 50 wherein variable characteristics are reset for the next calculation before proceeding to BLOCK 52, 53, 58. At this BLOCK the estimated temperature prediction is compared with a preset maximum temperature. If the estimated temperature prediction is less than the preset maximum temperature, then the program does not disable the traction control system and proceeds via LINE 57 to the RETURN 200. If the estimated temperature prediction is greater than the preset maximum temperature, then the traction control system is disabled via LINE 54 at BLOCK 56 and a warning signal (TOO HOT FAULT) is energized before the program proceeds via LINE 55 to the RETURN 200. This completes a typical cycle of the program when it has been determined that the vehicle brakes are in a mode of operation comprising non-braking, non-traction control, and the vehicle at idle speed comprising less than or equal to 13 kph/8 mph.

Returning to BLOCK 42, if it has been determined that the vehicle speed is greater than 13 kilometers per hour/8 miles per hour (vehicle and brakes moving), the program proceeds via LINE 44 to BLOCK 60 to determine whether or not the traction control system is active. Should it be determined that the traction control system is not active, the program proceeds via LINE 62 to BLOCK 63 where it is determined whether or not the brakes are applied. If it is determined that the brakes are not being applied at BLOCK 63, the program proceeds via LINE 65 to BLOCK 70 in order to set the parameters (during this loop) for cooling in the situation where the vehicle is moving. Block 70 sets the parameters for cooling which includes a convective cooling factor. The program proceeds from BLOCK 70 via LINE 73 to BLOCK 105 in order to compute the new temperature prediction based on rotor characteristics, heating/cooling parameters and the temperature of the last loop. BLOCK 105 provides an estimated temperature prediction which is transmitted via LINE 90 to BLOCK 50 and for the ultimate determination of whether or not the traction control system should continue to be enabled or should be disabled as described above. This completes a cycle of the program when it has been determined that the vehicle brakes are in a mode of operation comprising non-braking, non-traction control, vehicle moving, and with the inclusion of the convective cooling factor in the temperature prediction calculation.

Returning to BLOCK 63, should it be determined that the brakes are applied but in a situation where the traction control system is not active, the program proceeds via LINE 64 to BLOCK 85, 85A where the vehicle speed is analyzed to determine whether or not it exceeds 80 kilometers per hour/50 miles per hour. Should the vehicle speed be greater than 80 kilometers per hour/50 miles per hour, then at BLOCK 91 the vehicle speed is set at a maximimum of 80 kilometers per hour/50 miles per hour and the program proceeds to BLOCK 93, 93A and B, 101. Should the vehicle speed be less than 80 kilometers per hour/50 miles per hour, the program proceeds via LINE 92 directly to BLOCK 93, 93A and B, 101. At BLOCK 93, 93A and B, 101, the program sets the parameters for heating based on brake pressure (actual or estimated) and deceleration for this particular loop. After accomplishing the setting of the parameters, the program proceeds via LINE 102 to BLOCK 105 and for the accomplishment of the remainder of the program as described above. Thus, the software program proceeds to make a determination of the mode of operation of the brake (adaptive braking system or non-adaptive braking system operation) and then utilizes various factors (such as convective cooling, vehicle speed, braking pressure) in order to provide an estimated temperature prediction which is compared with the preset maximum temperature in order to determine whether or not the traction control system should continue to be enabled or should be disabled.

Returning to BLOCK 60, if the traction control system is active the program proceeds via LINE 71 to BLOCK 75, 75A, 76, 78, 80, 82, 84 where estimated braking pressure is calculated as a function of vehicle speed. This estimation is inputted via LINE 64 to BLOCK 85, 85A where the vehicle speed is analyzed to determine whether or not it exceeds 80 kilometers per hour/50 miles per hour. The program proceeds as described above wherein the steady state temperature ($T_{ss}$) is calculated and then the estimated temperature prediction is calculated and compared with the preset maximum temperature to determine if the traction control system should be disabled. This completes a cycle of the program when it has been determined initially that the vehicle brakes are in a mode of operation comprising braking during traction control system operation.

Figure 3A:
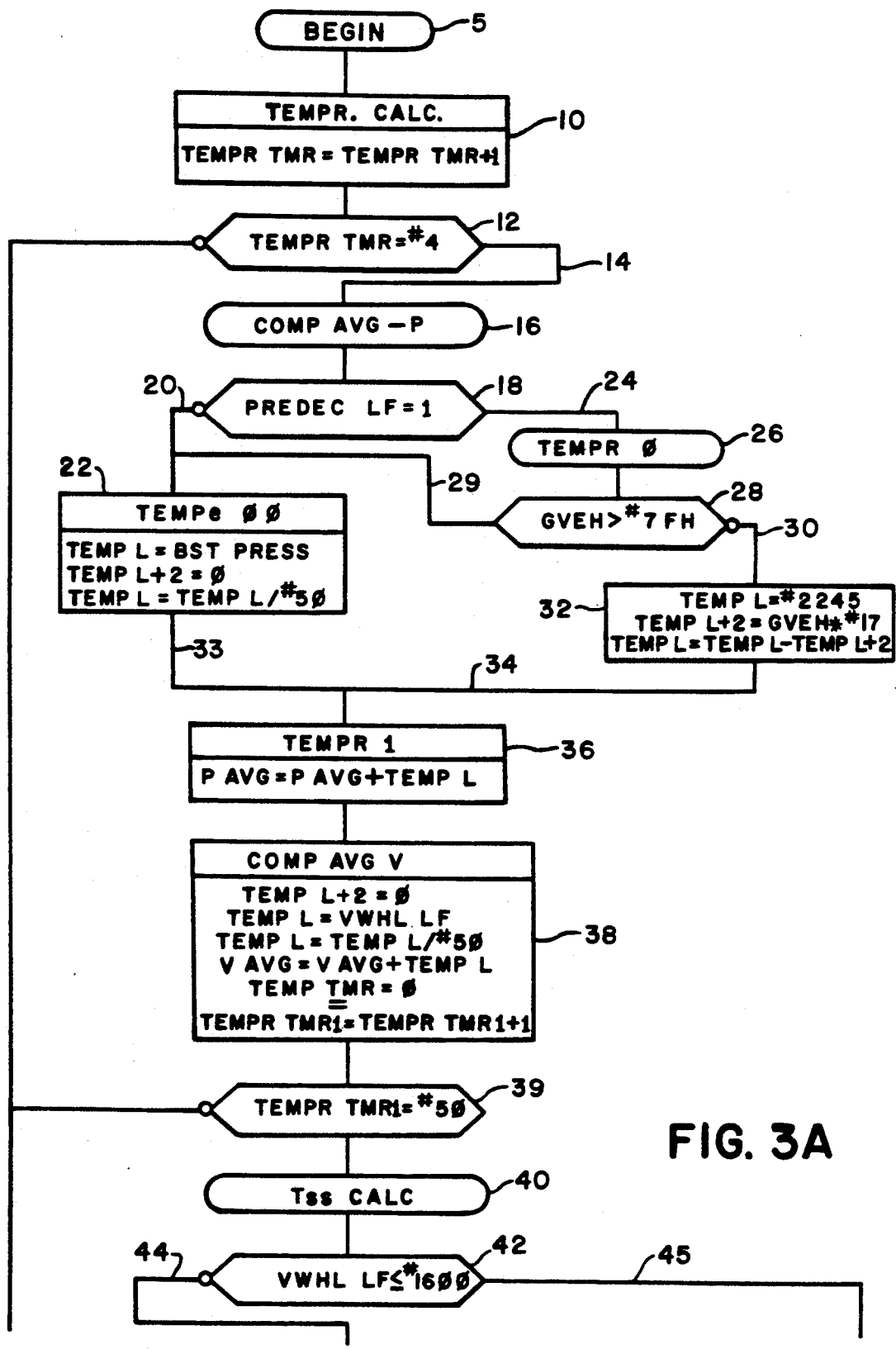
Figure 3B:
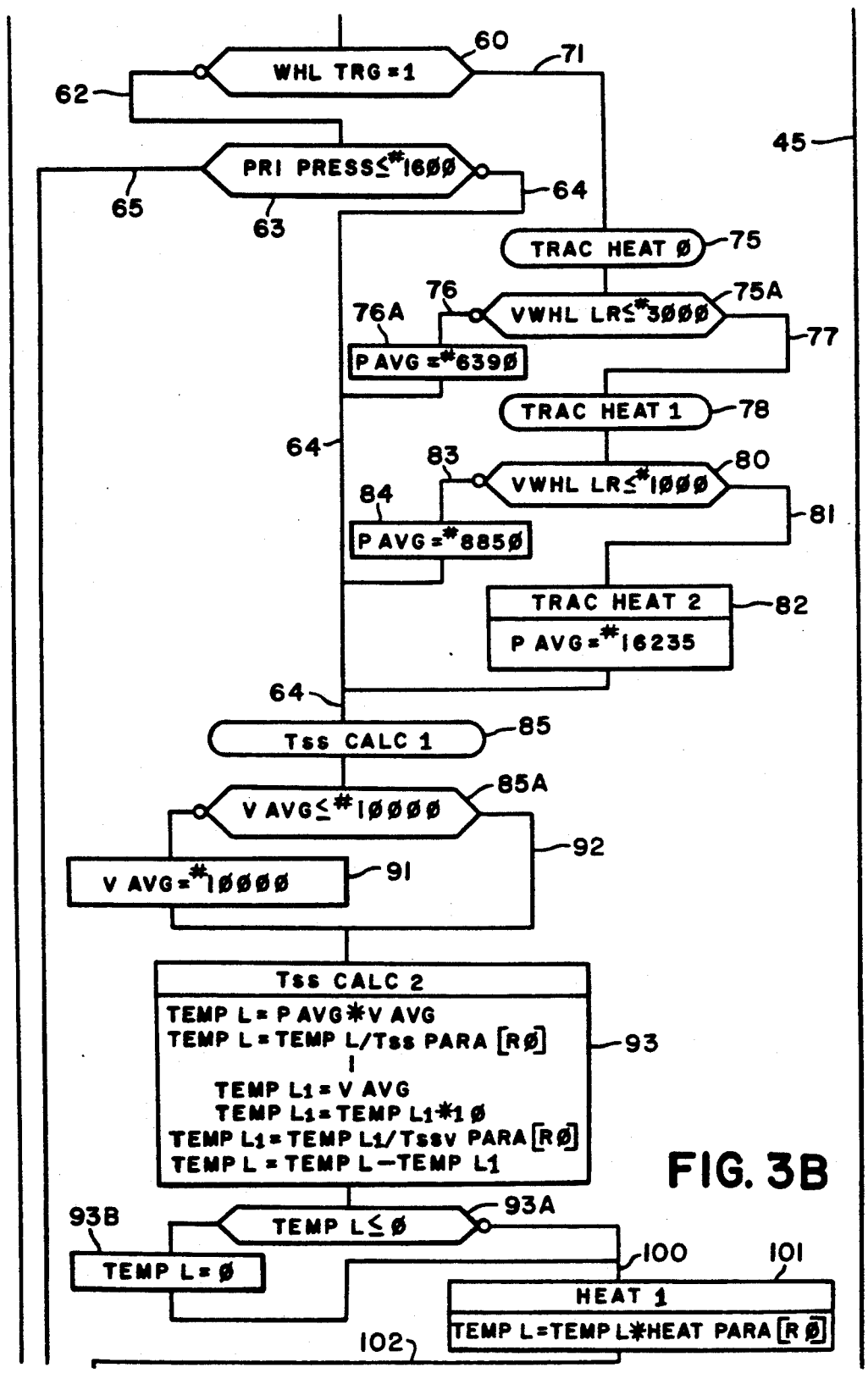
Figure 3C:
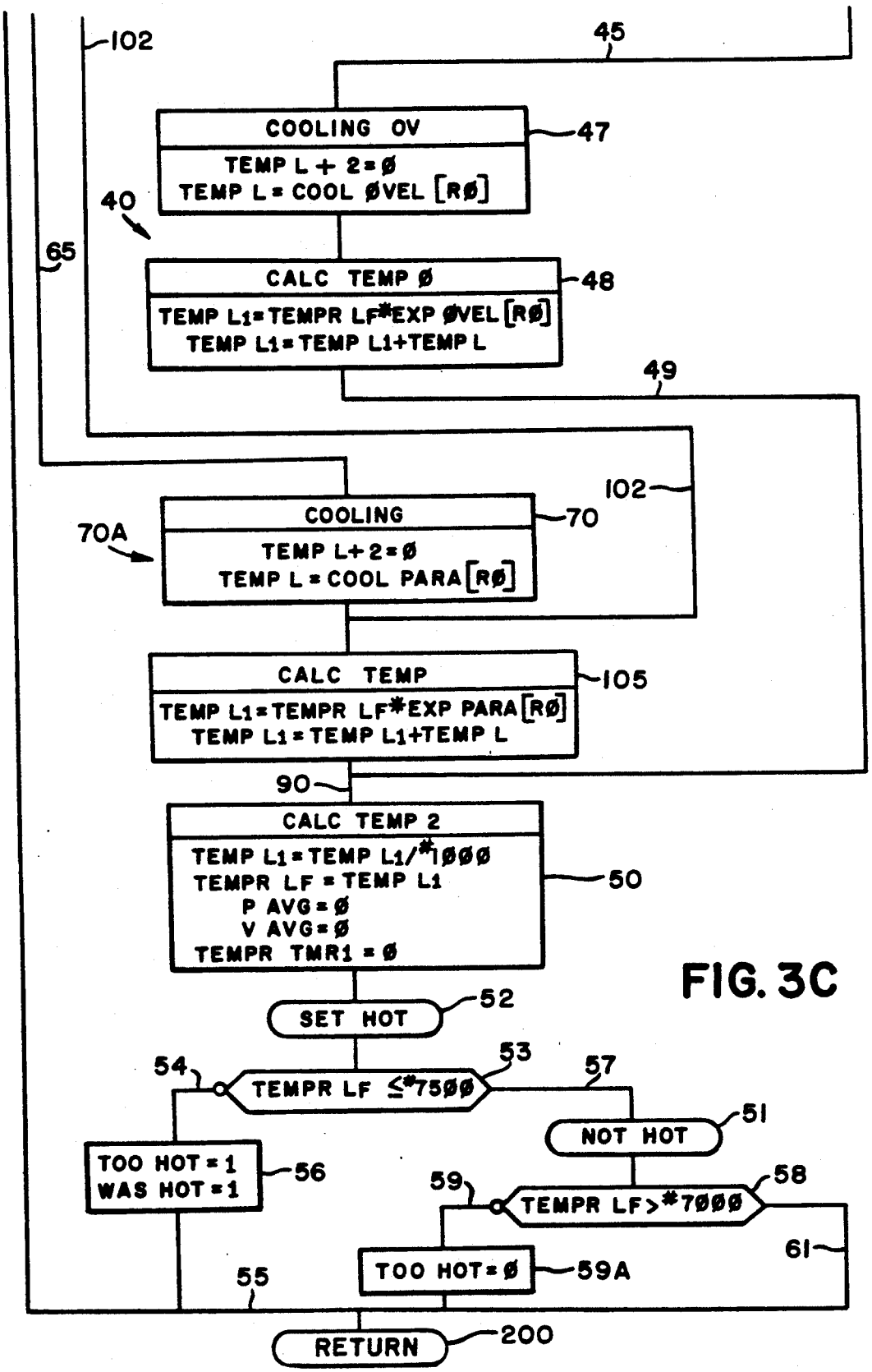

A more detailed description of the software program disclosed in FIGS. 1 and 2 and comprising a practical embodiment of such a software program is illustrated in FIGS. 3A-3C. The various BLOCKS of this detailed software program contain numbers many of which correspond to the numbers utilized in the flow diagrams of FIGS. 1 and 2. Referring to the BLOCK diagrams of the software program in FIGS. 3A-3C utilized for brake lining temperature prediction, the program begins at BLOCK 5 and values are initialized such as the TEMP TIMER in BLOCK 10 wherein the clock is initially set at 0+1. The TEMP TIMER which operates on a 20 mill timer is, at BLOCK 12, divided by 4 so that a 5 millisecond time cycle is set and transmitted via LINE 14. BLOCK 16 establishes that for each 5 millisecond cycle the average braking pressure will be computed. It has been determined that there are three ways in which braking pressure may be utilized relative to brake lining heating or temperature. First, the pressure at a transducer either during non-adaptive braking or when the vehicle is accelerating may be related to temperature. Second, there is a linear relationship of pressure with vehicle deceleration during adaptive braking, and third, pressure may be related to vehicle speed during traction control. Returning to the diagram, BLOCK 18 is a cycling flag which indicates whether or not the adaptive braking system is operating or not operating. If the adaptive braking system is not operating, then via LINE 20 the temperature may be set for heating by utilizing the transducer pressure during non-adaptive braking system operation only when the vehicle is accelerating. In accordance with BLOCK 22 indicating that the TEMP ØØ is to be determined, TEMP L is equal to the boost pressure, and then TEMP L plus 2 is set equal to 0 so that TEMP L equals TEMP L or the boost pressure divided by 50 which provides the boost pressure every 20 milliseconds. The boost pressure which is read by a boost transducer indicates how hard the boost pressure is being pushed.

If the adaptive braking system is operating, then via LINE 24 the TEMP R at Ø subroutine is utilized via BLOCK 26 to determine a relationship between pressure and heating. During adaptive braking system operation, boost pressure is not representative of temperature, and therefore, BLOCK 28 directs that if the vehicle is accelerating then, via LINE 29, the temperature set for non-adaptive braking system operation is utilized because during non-adaptive braking system operation the transducer pressure is representative of braking. If the vehicle is decelerating, then via LINE 30, an equation is utilized to calculate a pressure based on a linear relationship between vehicle deceleration during adaptive braking system operation and pressure. Because pressure relative to vehicle deceleration during adaptive braking system cycling is not precisely known, it is necessary to estimate the pressure relative to deceleration. The equations at BLOCK 32 are executed to provide approximate pressure during deceleration. BLOCK 32 involves a scaling operation necessary to scale vehicle deceleration to the boost pressure scale utilized in BLOCK 22. First, TEMP L is set equal to 2245 which is an offset necessary to place pressure in terms of deceleration. TEMP L+2 is then set equal to vehicle deceleration (GVEH) times 17. Then TEMP L is set equal to the offset 2245 minus the previous quantity comprising TEMP L+2. This completes the scaling of the pressure/temperature relationship during vehicle deceleration so that it may be utilized via LINE 34 at BLOCK 36 just as the TEMP L factor provided by BLOCK 22 via LINE 33 may be utilized at BLOCK 36. In whichever manner the relationship occurs between pressure and temperature in relation to the adaptive braking system, the program proceeds via either LINES 33 or 34 to further relate braking pressure to temperature. In accordance with BLOCK 36, the average pressure is set by taking the TEMP L value (BLOCKS 22 and 32) relating to pressure and adding it to P AVERAGE (average pressure) each 20 milliseconds. Next, according to BLOCK 38, the average velocity (V.AVG) of the vehicle is computed by setting TEMP L+2=0 and then looking at the left wheel speed (VWHL.LF) of the vehicle and dividing this by 50 so that the average velocity (V.AVG) is equal to the initial average velocity (V.AVG) plus the TEMP L calculated previously. This now creates the pressure and velocity relationship. Next TEMP TIMER is set to 0 for purposes of clocking of the software program. Initially, TEMP TIMER 1 is equal to TEMP TIMER 1 plus 1. BLOCK 39 then directs that TEMP TIMER be incremented by 1 so that 50 increments are equal to 1 second. At BLOCK 40 begins the subroutines for calculating or predicting the estimated temperature of the brake linings. Proceeding from BLOCK 40 to BLOCK 42, the left front wheel of the vehicle is examined via the wheel speed sensor to determine the speed thereof. If the wheel speed is greater than approximately thirteen kilometers per hour or eight miles per hour (#1600), then the program proceeds via LINE 44. When the vehicle's speed is greater than 13 kph/8 mph, this indicates that the traction control system may be operational. If the vehicle wheel speed is equal to or less than 13 kph/8 mph, then the program proceeds via LINE 45 which goes immediately to a cooling subroutine at BLOCK 47 in FIG. 3C. The cooling subroutine is for the non-braking, non-traction control, idle mode of brake operation and no heating of the brake linings is assumed during this mode. Referring to the cooling subroutine beginning with BLOCK 47, TEMP L+2 is set at 0 and then TEMP L equals COOL ØVEL [RØ] which is set at an operational ambient temperature value of 100° F. In order to calculate and predict the temperature in accordance with BLOCK 48, the temperature is calculated by taking the previous TEMP LF times an exponential function, and this is derived by utilizing the formula typically utilized to predict the brake temperature of a solid brake rotor during repeated braking. The formula is a well known formula which is described in SAE Seminars entitled: "Brakes: Design and Safety, Chapter 3. Thermal Analysis of Friction Brakes". SAE Seminars present a number of rotor temperature prediction mechanisms, this particular mechanism being for the prediction of brake temperature during repeated braking. If the braking time is considered not negligible as compared to the cooling time, then the cooling during braking has to be included in the analysis. The formulation results in the temperature response:

$$T(t) = \{T_i - [T_x + q_o/(A_r h_r)]\} \times$$
$$\exp\{[-h_r A_r/p_r c_r v_r)]t_a\} + T_x + q_o/(A_r h_r), °F$$

where
$A_r$ = rotor surface area, ft$^2$
$h_r$ = heat transfer coefficient, BTU/h·°F·ft$^2$
T = temperature at time t, °F.
$T_x$ = ambient temperature, °F.
$T_i$ = initial temperature, °F.
$c_r$ = specific heat of rotor, BTU/lbm·°F.

$v_r$ = rotor volume, ft$^3$
$p_r$ = rotor density, lbm/ft$^3$
$q_o$ = braking energy absorbed by rotor, BTU/h
$t_a$ = time during which brakes are applied, h The above temperature equation will provide the temperature rise during the braking period. TEMP L1 is set equal to TEMP L1 + TEMP L. After calculating the temperature rise via the utilization of the equation in BLOCK 48, the program proceeds via LINE 49 to a final temperature calculation where the values are scaled down and variables are reset for the next calculation. Because the inputted parameter value is higher than the pressure, BLOCK 50 divides the TEMP L1 by 1000 and then TEMP L1 is related to TEMP LF wherein TEMP LF is ten times the temperature. The average pressure (P.AVG) and average velocity (V.AVG) are both reset to 0 for the 20 millisecond cycle and TEMP TIMER 1 is reset. BLOCK 52 then evaluates the TEMP LF predicted via certain temperature thresholds which will determine what effect there is upon the operation of the traction control system. At BLOCK 53, if the predicted TEMP LF is greater than #7500 (750° F.), then via LINE 54 the program will not permit the traction control system to operate; the flags TOO HOT=1 and WAS HOT=1 are set at BLOCK 56, the TOO HOT flag preventing the system from operating and WAS HOT sets a condition fault for future maintenance reference. The program proceeds via LINE 55 to the final return BLOCK 200 so that the program will again cycle. Returning to BLOCK 53, if the TEMP LF is equal to or less than #7500 (750° F.) which is approximately 10 times the temperature, then via LINE 57 the program will go to BLOCK 51 and flag NOT HOT wherein the traction control system is allowed to operate. BLOCK 58 determines that if the TEMP LF drops below #7000 (700° F.), then via line 59 the flag TOO HOT=0 at BLOCK 59A may be set and operation of the traction control system is permitted. If the TEMP is above #7000 (700° F.), the traction control system is allowed to operate via LINE 61, but the TOO HOT=0 flag is not set.

Returning to BLOCK 42 in FIG. 3A, if the vehicle wheel speed is greater than 13 kph/8 mph, then the program proceeds via LINE 44 to BLOCK 60 which determines whether the traction control system is on or off. If the wheel speed is greater than 13 kph/8 mph and the traction control system is not operating, the program proceeds via LINE 62 to BLOCK 63 where the primary pressure is set at a nominal pressure of 84 psi by comparing PRI.PRESS with #6000. 84 psi in the braking system is approximately the minimum pressure present if the operator's foot is on the brake. If the pressure is 84 psi or greater, then (via LINE 64) this indicates that during non-traction control system operation the vehicle operator may be braking and thus effecting heating of the brake linings, and the program proceeds to BLOCKS 85, 85A (see below for further explanation). If the pressure is less than 84 psi, then the program proceeds via LINE 65 upon the assumption that the vehicle operator is not braking the vehicle. LINE 65 proceeds directly to the second cooling routine 70A (FIG. 3C) at BLOCK 70 and BLOCK 105 which is essentially the same as the cooling routine 40 at BLOCKS 47, 48 but with some slight difference because the vehicle is moving and convection cooling must be considered. Cooling routine 70A follows the same steps as cooling routine 40 at BLOCKS 47,48 except that "PARA" is utilized to designate this cooling routine and the ambient temperature value is 300° F. for COOL PARA [RØ]. In determining the TEMP L1 at BLOCK 105 by setting it equal to the previous temperature (TEMP LF) times the exponential EXP PARA [RØ], EXP PARA [RØ] equals 0.993. TEMP L1 is set equal to TEMP L1 calculated plus TEMP L as an offset. The temperature produced is provided via LINE 90 to the scaling and resetting operations of BLOCK 50. This provides a temperature prediction which accounts for convective cooling due to the speed of the vehicle. A further explanation of the equation utilized in BLOCK 105 is contained below with reference to FIG. 1.

Returning to BLOCK 60 and proceeding via LINE 71 if there is an indication that the traction control system is operating, the brake lining temperature prediction will be developed by relating estimated braking pressure to the vehicle speed which occurs during traction control. BLOCKS 75 and 75A accomplish this by first having the program look at a vehicle rear wheel speed. If at BLOCK 75A the rear wheel speed is greater than #3000 (24 kph/15 mph), then the program proceeds via LINE 76 to LINE 64 wherein the average pressure is set at BLOCK 76A as #6390 or 100 psi. This can be done because vehicle speed is related to a steady state pressure. It has been found that the lower the speed of the vehicle, the higher the pressure. Thus, via LINE 77 if the vehicle speed is equal to or less than #3000 (24 kph/15 mph), the program proceeds to BLOCKS 78, 80 wherein if the vehicle speed is equal to or less than #1000 (8 kph/5 mph) the pressure (P.AVG) is set via LINE 81 and BLOCK 82 at #16235 (500 psi). If the vehicle speed is greater than #1000 (8 kph/5 mph), then via LINE 83 and BLOCK 84 the pressure (P.AVG) is set at #8850 (200 psi). Whichever pressure is set according to the vehicle speed, these values are transmitted by means of LINE 64 to the subroutine at BLOCKS 85, 85A. At BLOCK 85A, the average velocity (V.AVG) is determined according to it being either less than or equal to #10000 (80 kph/50 mph). If the speed is greater than #10000 (80 kph/50 mph), V.AVG is set equal to the maximum speed of #10000 or 80 kph/50 mph at BLOCK 91 because the model requires no additional heating above this speed. If vehicle speed is less than #10000 (80 kph/50 mph), the program utilizes this speed (V.AVG) via LINE 92. Proceeding with the TEMP L or Temperature Steady State) prediction calculation at BLOCK 93, TEMP L is equal to the average pressure (P.AVG) set by the above vehicle speed/ pressure subroutine (BLOCKS 75, 75A,76,80,82,84,85,85A) times the average velocity (V.AVG) of the vehicle. The calculations initialized by BLOCK 93 are resetting, in essence, the software calculations to the vehicle parameters based on pressure and speed during heating, for further use at BLOCK 105. Specifically, the numerical factors in terms of computer scaling designated by counts per mile per hour are scaled to feet per second in order to permit the utilization of TEMP L (temperature steady state) PARA [RØ]in BLOCK 105. TEMP L is divided by $T_{ss}$(temperature steady state) PARA [RØ]which is P.AVG times V.AVG/9.28. TEMP L1 is set equal to V.AVG, and TEMP L1 set equal to TEMP L1 times 10 in order to scale up TEMP L1 by a factor of 10. TEMP L1 is then divided by $T_{ssv}$ PARA[RØ]which is a scaling factor utilized to convert computer scaling in counts/mph to ft/sec to permit the utilization of the steady state temperature (TEMP L) in BLOCK 105. Finally, TEMP L (steady state temperature) is set equal to TEMP L −TEMP L1. At BLOCK 93A, if TEMP L is less than 0 it is set equal to 0 at BLOCK 93B, and if TEMP L is greater than 0 it is communicated via line 100 to BLOCK 101. BLOCK 101 sets TEMP L as TEMP L times the heat parameter HEAT PARA [R0] which is an incremental change in the estimated or predicted temperature. Thus, TEMP L times HEAT PARA [R0] is TSS times 0.007. The program proceeds via LINE 102 directly to the final calculation of TEMP L1 at BLOCK 105. Again the estimated temperature prediction equation is utilized and it is slightly different for the situation where the vehicle velocity is greater than 0. Referring to FIG. 1, BLOCK 105 estimates the temperature by utilizing the basic equation $T_{ss}[1-e^{-kt}]=T_{est}$ which is simplified to $T_{est}=0.007T_{ss}+0.993T_o$. $T_o$ is the previously calculated temperature from the last loop multiplied by 0.993 (expressed as TEMP LF×EXP.PARA [RØ]) and added to 0.007 times Temperature steady state in heating (from BLOCK 101) to provide $T_{est}$ which is TEMP L1. Once the TEMP L1 prediction is calculated, the program proceeds via LINE 90 to the scaling and resetting of values at BLOCK 50 and then to BLOCKS 52, 53 for the determination of whether or not the traction control system will be utilized or disabled.

We claim:

1. A method of calculating a brake lining temperature prediction for the control of a braking system including a traction control system, comprising the steps of:
   a. determining the mode of a brake as being one of:
      1. non-braking and non-traction control,
      2. braking during non-adaptive braking system operation,
      3. braking during adaptive braking system operation, and
      4. traction control system operation,
   b. calculating a temperature prediction based on cooling of the brake, when mode a.1. occurs,
   c. measuring actual braking pressure and calculating a steady state temperature which is then utilized to calculate a temperature prediction based on a heating profile of the brake, when mode a.2. occurs,
   d. utilizing an estimation of braking pressure and vehicle deceleration for the calculation of a steady state temperature and calculating a temperature prediction based on the heating profile of the brake, when mode a.3. occurs,
   e. utilizing estimated braking pressure and vehicle wheel speed for the calculation of a steady state temperature which is then utilized to calculate a temperature prediction based on the heating profile of the brake, when mode a.4. occurs, and
   f. comparing the temperature prediction with a temperature limit in order to effect one of permitting and not permitting operation of the traction control system.

2. The method of brake lining temperature prediction and control in accordance with claim 1, wherein step b. includes the step of determining if a vehicle wheel is moving at one of above and below a slow moving speed of approximately thirteen kilometers per hour.

3. The method of brake lining temperature prediction and control in accordance with claim 2, further comprising the step of including a convective cooling factor in the calculation of the temperature prediction of step b. when the vehicle speed exceeds thirteen kilometers per hour.

4. The method of brake lining temperature prediction and control in accordance with claim 1, wherein each step of calculating a steady state temperature further includes the step of utilizing an input of vehicle speed.

5. The method of brake lining temperature prediction and control in accordance with claim 4, further including the step of providing a warning signal should operation of the traction control system not be permitted.

6. The method of brake lining temperature prediction and control in accordance with claim 4, further comprising the step of limiting the input of vehicle speed to a maximum of approximately eighty kilometers per hour.

7. The method of brake lining temperature prediction in and control accordance with claim 4, further comprising the step of utilizing a vehicle wheel speed for establishing said vehicle speed.

8. The method of brake lining temperature prediction and control in accordance with claim 4, further comprising the step of utilizing vehicle wheel speed to compute average velocity every 20 milliseconds.

9. The method of brake lining temperature prediction and control in accordance with claim 8, further comprising the step of determining if the vehicle wheel speed exceeds a predetermined vehicle wheel speed.

10. The method of brake lining temperature prediction and control in accordance with claim 1, further comprising the step of determining braking pressures every twenty milliseconds.

11. The method of brake lining temperature prediction and control in accordance with claim 1, wherein step e. comprises estimating braking pressure as a function of vehicle speed during traction control system operation.

12. The method of brake lining temperature prediction and control in accordance with claim 1, further comprising the step of retaining an indication that the temperature prediction exceeded the temperature limit should the traction control system not be permitted to operate.

13. In a wheeled vehicle having means for supplying pressurized brake fluid to actuate the associated wheel brakes of the vehicle, a brake control system for providing both adaptive braking operation and traction control operation of at least one selected wheel brake of the vehicle, said control system calculating a brake lining temperature prediction and including:
 a. means for determining the mode of the selected wheel brake as being one of:
  1. non-braking and non-traction control,
  2. braking during non-adaptive braking operation,
  3. braking during adaptive braking operation, and
  4. traction control operation,
 b. means for calculating a temperature prediction based on cooling of the selected wheel brake, when mode a.1. occurs,
 c. means for measuring actual braking pressure and calculating a steady state temperature which is utilized to calculate a temperature prediction based on a heating profile of the brake, when mode a.2. occurs,
 d. means utilizing estimated braking pressure and vehicle deceleration for calculating a steady state temperature and calculating a temperature prediction based on the heating profile of the brake, when mode a.3. occurs,
 e. means utilizing estimated braking pressure and vehicle wheel speed for calculating a steady state temperature and calculating a temperature prediction based on the heating profile of the brake, when mode a.4. occurs, and
 f. means for comparing the respective temperature prediction with a temperature limit in order to determine one of permitting and not permitting traction control operation by the control system.

14. The brake control system in accordance with claim 13, wherein the means for calculating a temperature prediction based on cooling of the selected wheel brake utilize a convective cooling factor when vehicle speed exceeds approximately thirteen kilometers per hour.

15. The brake control system in accordance with claim 13, wherein the means of paragraphs c., d., and e. utilize an input of vehicle speed.

16. The brake control system in accordance with claim 15, further comprising means for limiting the input of vehicle speed to a maximum of approximately eighty kilometers per hour.

17. The brake control system in accordance with claim 13, further comprising means for providing a warning signal should traction control operation not be permitted.

18. The brake control system in accordance with claim 17, wherein the warning signal means includes means for retaining an indication that the temperature prediction exceeded the temperature limit.

19. The brake control system in accordance with claim 13, further comprising means for determining vehicle speed at predetermined intervals of time.

20. The brake control system in accordance with claim 13, further comprising means for determining brake pressure at predetermined intervals of time.

21. A method of calculating a brake lining temperature prediction for the control of a braking system including a traction control system, comprising the steps of:
 a. determining the mode of a brake as being one of:
  1. non-braking and non-traction control, and
  2. traction control system operation,
 b. calculating a temperature prediction based on cooling of the brake when mode a.1. occurs,
 c. utilizing estimated braking pressure and vehicle wheel speed for the calculation of a temperature prediction based on a heating profile of a brake when mode a.2. occurs,
 d. comparing the temperature prediction with a temperature limit in order to determine one of permitting and not permitting operation of the traction control system, and
 e. controlling operation of the braking system.

22. The method of calculating a brake lining temperature prediction in accordance with claim 21, wherein step c. includes the calculation of a steady state temperature which is utilized to calculate said temperature prediction.

23. The method of calculating a brake lining temperature prediction in accordance with claim 21, further comprising the steps of measuring actual braking pressure and calculating a steady state temperature which is then utilized to calculate a temperature prediction based on the heating profile of the brake, as a result of non-adaptive and non-traction control barking during braking system operation.

24. The method of calculating a brake lining temperature prediction in accordance with claim 21, further comprising the steps of utilizing an estimation of braking pressure and vehicle deceleration for calculating a steady state temperature and then calculating a temperature prediction based on the heating profile of the brake, as a result of braking during adaptive braking system operation.

25. A method of calculating a brake lining temperature prediction for the control of a braking system including a traction control system, comprising the steps of:
   a. calculating a temperature prediction based on cooling of the brake, as a result of non-braking and non-traction control of the braking system,
   b. comparing the temperature prediction with a temperature limit in order to determine one of permitting operation and not permitting operation of the traction control system, and
   c. controlling operation of the braking system.

26. A method of calculating a brake lining temperature prediction for the control of a braking system including a traction control system, comprising the steps of:
   a. utilizing an estimation of braking pressure and vehicle deceleration to calculate a temperature prediction based on a heating profile of a brake, as a result of braking during adaptive braking system operation,
   comparing the temperature prediction with a temperature limit in order to determine one of permitting operation and not permitting operation of the traction control system, and
   c. controlling operation of the braking system.

27. The method of calculating a brake lining temperature prediction in accordance with claim 26, wherein step a. includes the calculation of a steady state temperature which is utilized to calculate said temperature prediction.

28. The method of calculating a brake lining temperature prediction in accordance with claim 27, further comprising the steps of measuring actual barking pressure and calculating a steady state temperature which is then utilized to calculate a temperature prediction based on the heating profile of the brake, as a result of braking during a non-adaptive braking system operation.

29. The method of calculating a brake lining temperature prediction in accordance with claim 28, further comprising the step of utilizing estimated braking pressure and vehicle wheel speed to calculate a temperature prediction based on the heating profile of a brake.

30. The method of calculating a brake lining temperature prediction in accordance with claim 26, further comprising the step of calculating a temperature prediction based on cooling of the brake, as a result of non-braking and non-traction control of the braking system.

31. A method of calculating a brake lining temperature prediction for the control of a braking system including a traction-control system, comprising the steps of:
   a. measuring actual braking pressure and calculating a temperature prediction based on a heating profile of the brake, as a result of non-adaptive and non-traction control braking during braking system operation,
   b. comparing the temperature prediction with a temperature limit in order to determine one of permitting operation and not permitting operation of the traction control system, and
   c. controlling operation of the braking system.

32. The method of calculating a brake lining temperature prediction in accordance with claim 31, wherein step a. includes the calculation of a steady state temperature which is utilized to calculate said temperature prediction.

* * * * *